Patented Oct. 27, 1936

2,058,489

UNITED STATES PATENT OFFICE 2,058,489

DYE POWDER COMPOSITIONS

Wilfred M. Murch, Hamburg, and Frances M. Higgins, Buffalo, N. Y., assignors to National Aniline and Chemical Company, Inc., New York, N. Y., a corporation of New York No Drawing. Application June 16, 1930, Serial No. 461,648

14 Claims.  (Cl. 8—6)

This invention relates to new dye powder compositions and to a process for preparing the same. More particularly the invention relates to new vat dye compositions in powder form and to the processes for their preparation.

Water-insoluble dyes, particularly vat dyes, are frequently prepared in the form of a paste for shipment, but due to the weight of the liquid constituent of the paste which adds to the cost of shipping, and the tendency of a paste to dry out when the container is opened, it is more advantageous to prepare the dyestuff in the form of a powder. However, when the vat dyes have been dried, they are not easily or quickly wetted by water, and they are difficult to disperse with water or in the vat so as to produce the stable dispersion which is required for printing or dyeing.

Upon adding a powdered vat dye to water a uniform paste can be prepared only by long continued agitation. The formation of a lumpy paste results in incomplete reduction when the dye is added to the vat, or in a longer time for the reduction to take place, either of which condition is disadvantageous. Further, a paste prepared from the powder should be stable, i. e., should not settle on long standing.

The present invention has for one of its objects the production of an improved dye powder composition, particularly a vat dye powder composition, which wets readily with water or in the vat, and disperses readily to form a stable paste or dispersion. A further object is the production of a concentrated dye powder composition having the said desirable characteristics. These and other objects will be apparent from a consideration of the present disclosure.

According to the present invention, the new dye powder compositions may be produced by incorporating a wetting agent and a solubilized modification of starch dispersing agent with a finely divided water insoluble dyestuff, more particularly a vat dyestuff, preferably in the form of an aqueous paste, evaporating the mixture to dryness, and disintegrating the dry residue by grinding or in any other suitable manner. Although it is possible to mix the ingredients of the powder composition in the dry state, a more intimate mixture, and a more satisfactory product, is produced by performing the mixing in the wet state. In order that the new dye powder compositions shall form a suitable dispersion when added to the dye bath or the vat, it is essential that the dyestuff shall be present in the powder in a very fine state of subdivision.

Since dyestuff pastes containing the dyestuff particles in a fine state of subdivision suitable for the present invention are readily prepared by methods known in the art, as by grinding in a suitable mill, etc., it is preferred to add the wetting agent and the dispersing agent to such a paste, evaporate the resulting mixture to substantial dryness, and disintegrate any lumps present in the dry residue by grinding in a ball mill or any other suitable apparatus. A small quantity of alkali is preferably present in such pastes to prevent undesired acidity in the powders produced therefrom.

As suitable wetting agents which may be used in accordance with the present invention may be mentioned the polynuclear aromatic sulfonic acids, the nuclear-alkyl derivatives of the polynuclear aromatic sulfonic acids, and the aldehyde, particularly formaldehyde, condensation products of said aromatic sulfonic acids and said derivatives, and especially those which belong to the naphthalene series. As employed herein the term "nuclear-alkyl derivatives" includes the nuclear-aralkyl and nuclear-cycloalkyl derivatives. Examples of said wetting agents are:— 2.6-, 1.7-, or 2.8-naphthalenedisulfonic acid, the isopropylnaphthalenesulfonic acids, butylnaphthalenesulfonic acids, dipropylnaphthalenesulfonic acids, dibutylnaphthalenesulfonic acids, amylnaphthalenesulfonic acids, butylbenzylnaphthalenesulfonic acids, cyclohexylnaphthalenesulfonic acids, etc., and the condensation products of benzaldehyde, acetaldehyde or formaldehyde with two mols of said acids, for instance, methylene-di (beta-naphthalenesulfonic acid), acetal-di (beta-naphthalenesulfonic acid), benzal-di (beta-naphthalenesulfonic acid), methylene-di (diisopropylnaphthalenesulfonic acid), etc. The wetting agents particularly contemplated for use in the present invention are the formaldehyde condensation products of the polynuclear aromatic sulfonic acids which contain one or more alkyl groups in the aromatic nucleus, and especially a formaldehyde condensation product of a sulfonic acid derivative of naphthalene known in the trade as "Leukanol". It is to be understood that where a liquid wetting agent is employed, only sufficient is used to function without producing a lumpy or moist powder.

As colloidal solubilized modifications of starch suitable for use as dispersing agents, there may be mentioned, by way of illustration, ordinary dextrin, soluble starch, soluble dextrin, alkali starch, etc. We have found that soluble dextrin serves as an excellent dispersing agent, particularly if it is heated in water to about boiling prior to admixture with the dye paste. The wetting agent may be added to the soluble dextrin before heating the same without injury to either, and the admixture added to the dye paste.

In addition to the wetting and dispersing agents hereinbefore specified, the dye powder composition may contain an alcohol, preferably an alcohol having a low vapor pressure at ordinary temperatures, for example, diethylene glycol, glycerine, triethanolamine, cyclohexanol, etc. Sufficient alcohol may be incorporated in the dye powder composition to assist in the wetting of the composition when it is added to water, but the amount of alcohol added should be insufficient to cause the powder to agglomerate to any appreciable extent. The alcohol may be incorporated in the composition before, after, or simultaneously with the wetting and/or dispersing agent. Further, it is to be understood that, to some extent, the wetting agents employed may have dispersing properties, and that the dispersing or stabilizing agents employed may have wetting properties.

As examples of suitable dyestuffs may be mentioned violanthrone, isoviolanthrone, nitroviolanthrone, dichlorisoviolanthrone, indanthrone, mono-chlorindanthrone, dichlorindanthrone, flavanthrone, pyanthrone, dichlorpyranthrone, naphthacridone, and other water-insoluble dyes, particularly vat dyes of the anthraquinone series.

The invention is illustrated by the following example:

*Example*

A powder is prepared from the following ingredients by the following procedure:

| | Pounds |
|---|---|
| Water | 200 |
| Soluble dextrin | 70 |
| "Leukanol" solid | 70 |
| 20% Carbanthrene Blue G C D paste (Colour Index No. 113) | 500 |

The dextrin is dissolved in the water heated to boiling, after which the "Leukanol" is added thereto. Boiling is continued until all is dissolved, which requires about ten to fifteen minutes. The liquor thus obtained is cooled to about 60° C., and the Carbanthrene Blue G C D paste is then added. The mixture is stirred until the ingredients are thoroughly intermingled, and is then dried at atmospheric pressure and ground to a powder.

Since changes in the invention above described may be made without departing from its scope, the above description is to be construed as illustrating rather than limiting the invention. It is also to be understood that the following claims are intended to cover the generic and specific features of the invention herein disclosed, and all statements of the scope of the invention which, as a matter of language, might be said to fall therebetween.

We claim:

1. A dye powder composition comprising a water insoluble dyestuff, a colloidal solubilized modification of starch and a wetting agent selected from the group consisting of the polynuclear aromatic sulfonic acids, their nuclearalkyl derivatives, and the aldehyde condensation products of said aromatic sulfonic acids and said derivatives.

2. A dye powder composition comprising a vat dyestuff, a colloidal solubilized modification of starch and a wetting agent selected from the group consisting of the polynuclear aromatic sulfonic acids, their nuclear-alkyl derivatives, and the aldehyde condensation products of said aromatic sulfonic acids and said derivatives.

3. A non-acid dye powder composition comprising a vat dyestuff, a colloidal solubilized modification of starch, and a wetting agent selected from the group consisting of the polynuclear aromatic sulfonic acids, their nuclearalkyl derivatives, and the aldehyde condensation products of said aromatic sulfonic acids and said derivatives, said powder being obtainable by drying an aqueous paste containing said dyestuff, said colloidal solubilized modification of starch, said wetting agent, and a small amount of alkali whereby the powder is rendered non-acid.

4. A dye powder composition comprising a vat dyestuff, a colloidal solubilized modification of starch, and a formaldehyde condensation product of a sulfonic acid derivative of naphthalene.

5. A dye powder composition comprising a vat dyestuff, a dextrin and a wetting agent selected from the group consisting of the polynuclear aromatic sulfonic acids, their nuclear-alkyl derivatives, and the aldehyde condensation products of said aromatic sulfonic acids and said derivatives, and obtainable by drying an aqueous mixture of a vat dyestuff, a dextrin and said wetting agent.

6. A dye powder composition comprising a vat dyestuff, a dextrin and an aldehyde condensation product of a naphthalene sulfonic acid, said powder forming a substantially uniform suspension of the dyestuff particles when treated with water and being obtainable by drying an aqueous paste containing said dyestuff, said dextrin and said condensation product.

7. A dye powder composition comprising a vat dyestuff, a dextrin and an aldehyde condensation product of an alkyl naphthalene sulfonic acid, said powder forming a substantially uniform suspension of the dyestuff particles when treated with water and being obtainable by drying an aqueous paste containing said dyestuff, said dextrin and said condensation product.

8. A dye powder composition comprising a vat dyestuff, soluble dextrin, and a wetting agent selected from the group consisting of the polynuclear aromatic sulfonic acids, their nuclear-alkyl derivatives, and the aldehyde condensation products of said aromatic sulfonic acids and said derivatives.

9. A dye powder composition comprising a vat dyestuff of the anthraquinone series, a dextrin and a formaldehyde condensation product of a naphthalene sulfonic acid, and obtainable by drying an aqueous paste containing said dyestuff, said dextrin and said condensation product.

10. A dye powder composition comprising a vat dyestuff of the anthraquinone series, a dextrin and a formaldehyde condensation product of an alkyl naphthalene sulfonic acid, and obtainable by drying an aqueous paste containing said dyestuff, said dextrin and said condensation product.

11. A dye powder composition comprising a vat dyestuff of the anthraquinone series, a dextrin and a formaldehyde condensation product of a sulfonic acid derivative of naphthalene, said dextrin and condensation product being present in substantially equal amounts.

12. A dye powder composition comprising an indanthrone, soluble dextrin, and a formaldehyde condensation product of a sulfonic acid derivative of naphthalene, said powder forming a substantially uniform suspension of the dyestuff particles when treated with water and being obtainable by drying an aqueous paste containing an indanthrone, soluble dextrin and said condensation product.

13. A process for preparing a dye powder composition which comprises forming a mixture of water, a soluble dextrin, a water insoluble dyestuff and a wetting agent selected from the group consisting of the polynuclear aromatic sulfonic acids, their nuclear-alkyl derivatives, and the aldehyde condensation products of said aromatic sulfonic acids and said derivatives, and evaporating the mixture to substantial dryness, said soluble dextrin being heated in water to about boiling as a part of the process.

14. A process for preparing a dye powder composition which comprises heating soluble dextrin with water to about boiling, forming a paste containing the heated soluble dextrin, a vat dyestuff and a formaldehyde condensation product of a sulfonic acid derivative of naphthalene, and evaporating the paste to substantial dryness.

WILFRED M. MURCH.
FRANCES M. HIGGINS.